US007006258B2

(12) United States Patent
Hikichi

(10) Patent No.: US 7,006,258 B2
(45) Date of Patent: Feb. 28, 2006

(54) IMAGE PROCESSING APPARATUS, CONTROL METHOD THEREFOR, AND IMAGE PROCESSING SYSTEM

(75) Inventor: Yukiyoshi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 09/745,480

(22) Filed: Dec. 26, 2000

(65) Prior Publication Data

US 2002/0039197 A1    Apr. 4, 2002

(30) Foreign Application Priority Data

Dec. 27, 1999   (JP)   ................................. 11-371414

(51) Int. Cl.
*G06K 15/00*   (2006.01)
(52) U.S. Cl. ..................................... 358/3.28; 358/3.31
(58) Field of Classification Search ................ 358/1.4, 358/3.28, 3.31, 450, 452, 462; 382/165; 369/30.21; 348/64, 222.1
See application file for complete search history.

(56) References Cited

U.S. PATENT DOCUMENTS

| | | | | |
|---|---|---|---|---|
| 5,170,253 A | * | 12/1992 | Horiuchi et al. | ............ 348/239 |
| 5,257,248 A | * | 10/1993 | Ogasawara | .............. 369/30.22 |
| 5,920,837 A | * | 7/1999 | Gould et al. | ................ 704/251 |
| 5,927,874 A | * | 7/1999 | Kikuta et al. | .......... 400/120.02 |
| 6,167,549 A | * | 12/2000 | Lin et al. | ..................... 714/763 |
| 6,507,629 B1 | * | 1/2003 | Hatakeyama | ................ 375/372 |
| 6,744,905 B1 | * | 6/2004 | Horiike | ...................... 382/100 |
| 2001/0003708 A1 | * | 6/2001 | Aizu et al. | ..................... 463/7 |
| 2003/0161496 A1 | * | 8/2003 | Hayashi et al. | ............. 382/100 |

FOREIGN PATENT DOCUMENTS

| | | |
|---|---|---|
| EP | 0 893 766 A2 | 1/1999 |
| EP | 0893766 A | 1/1999 |
| JP | 6-111019 | 2/1994 |
| JP | 6-111019 | 4/1994 |
| JP | 11-045225 | 2/1999 |
| JP | 11-45225 | 2/1999 |

* cited by examiner

*Primary Examiner*—Jerome Grant, II
(74) *Attorney, Agent, or Firm*—Fitzpatrick, Cella, Harper & Scinto

(57) ABSTRACT

Conventionally in performing add-on processing of a predetermined code for input image data, a memory for transferring the input image data to an add-on processor and a memory for transferring it from the add-on processor to a subsequent processor cannot be shared. This invention includes a DoEngine capable of arbitrarily controlling connection switching and simultaneous execution of a plurality of components. When image data input by a scan processor is to be stored in a memory, and a predetermined code is to be added to the image data by an image processor, the DoEngine controls accesses to the same memory by the scan processor and image processor. Accordingly, these accesses are almost simultaneously executed, and the scan processor and image processor parallel-operate.

32 Claims, 7 Drawing Sheets

IMAGE PROCESSING APPARATUS, CONTROL METHOD THEREFOR, AND IMAGE PROCESSING SYSTEM

FIELD OF THE INVENTION

The present invention relates to an image processing apparatus, a control method therefor, and an image processing system and, more particularly, to an image processing apparatus for adding specific information to image data, a control method therefor, and an image processing system.

BACKGROUND OF THE INVENTION

Conventionally, copying machines, facsimile apparatuses and the like have been commercially available as image processing apparatuses which are combinations of image input devices such as a scanner and image output devices such as a printer.

In such an image processing apparatus, particularly, a color copying machine, there is proposed a technique of adding add-on data such as an identification code (e.g., a machine number) to a copied image in order to prevent illicit use of copies, as disclosed in, e.g., Japanese Patent Laid-Open No. 6-111019. As add-on data, a color such as light yellow which is difficult for the human eye to recognize is used.

SUMMARY OF THE INVENTION

The conventional image processing apparatus must individually comprise a memory module for transferring image data sent from an image input unit to an add-on processor, and a memory module for transferring it from the add-on processor to a subsequent processor. That is, the image processing apparatus must use a plurality of memory modules in order to realize add-on processing, and the same memory module cannot be shared. This increases the cost, which is the first problem.

Moreover, a memory module for add-on processing is dedicated to it, so its capacity is fixed and cannot be flexibly changed, which is the second problem.

Accordingly, in view of the first problem set forth above, a first object of the present invention is to provide an image processing apparatus capable of performing a plurality of processes by the same memory module, a control method therefor, and an image processing system.

In view of the second problem set forth above, a second object of the invention is to provide an image processing apparatus capable of flexibly changing a usable memory size, a control method therefor, and an image processing system.

According to the present invention, the foregoing objects are attained by providing an image processing apparatus comprising; data input means for inputting image data and storing the image data in a memory; addition means for adding a predetermined code to the image data stored in said memory; and control means for controlling access to said memory by said data input means and said addition means, wherein said control means controls said data input means and said addition means so as to substantially simultaneously execute said data input means and said addition means.

In accordance with the present invention as described above, the data input means and the addition means are almost simultaneously executed using the same memory module without using dedicated memory modules. This reduces the cost in the image processing apparatus, and at the same time increases the throughput of the whole apparatus.

In another aspect of the present invention, the foregoing objects are attained by providing the apparatus wherein said control means can arbitrarily control connection switching and simultaneous operation of a plurality of components including said data input means, said memory, and said addition means, and dynamically changes a usable size in said memory in accordance with operation statuses of the plurality of components.

In accordance with the present invention as described above, a plurality of processes using the same memory module can be executed in real time. Maximum performance can be obtained using the hardware resources available.

The invention is particularly advantageous that a plurality of processes can be done by the same memory module. Further, a memory size to be used can be dynamically changed.

Hence, the performance of the whole apparatus can be maximized to increase the total throughput.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
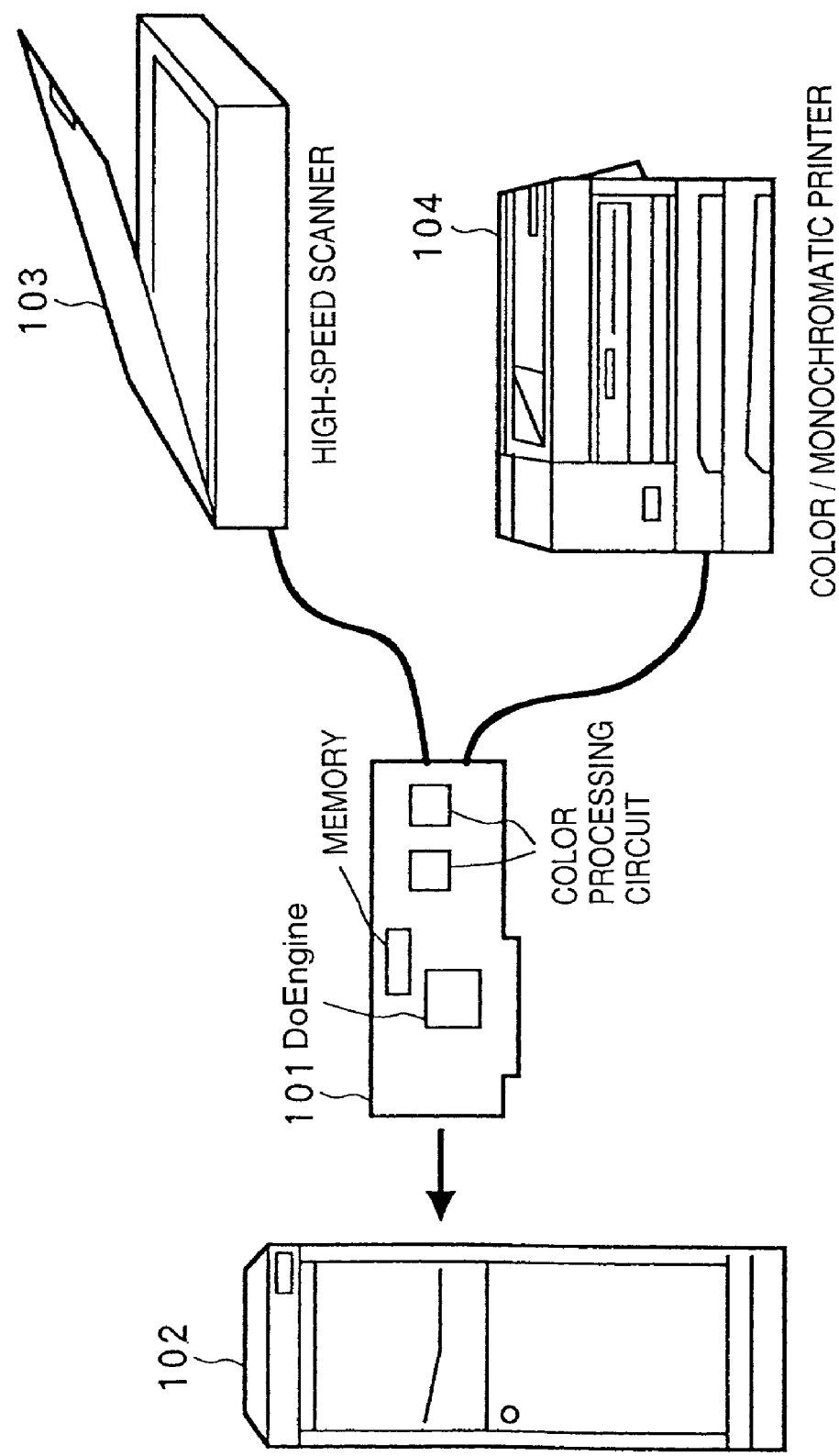
FIG. 1 is a diagram showing the configuration of an apparatus or system using a DoEngine.

Preferred embodiments of the present invention will now be described in detail in accordance with the accompanying drawings.

<First Embodiment>

First, a "DoEngine" as a single-chip scanning and printing engine incorporating a processor core, a processor peripherals controller, a memory controller, a scanner/printer controller, a PCI interface and the like will be first described as hardware used in this embodiment that can simultaneously process a plurality of functions.

Details of the DoEngine capable of a plurality of simultaneous processes are disclosed as Japanese Patent Laid-Open No. 11-45225 filed by the present applicant, and an overview thereof will be explained.

A DoEngine is a single-chip scanning and printing engine internally incorporating a processor core compatible with the R4000 processor manufactured by MIPS Technologies, Inc., a processor peripherals controller, a memory controller, a scanner/printer controller and a PCI interface. The DoEngine employs high-speed parallel operation and building-block techniques.

It is possible to internally incorporate a 32-KB cache memory having a maximum of 16 KB of memory for each of transactions and data, an FPU (floating-point operation unit), an MMU (memory management unit) and a user definable coprocessor in the processor shell (the generic term for the processor peripherals circuitry inclusive of a coprocessor).

Since the DoEngine has a PCI bus interface, it is capable of being used together with a computer system having a PCI bus slot. In addition to being usable in a PCI satellite configuration, the DoEngine is capable of being issued in a PCI bus configuration in the form of a PCI host bus bridge. By being combined with an inexpensive PCI peripheral device, the DoEngine can also be used as the main engine of a multifunction peripheral. Furthermore, it is also possible to combine the DoEngine with a rendering engine or compression/expansion engine having a PCI bus interface.

The DoEngine has two independent buses within its chip, namely an IO bus for connecting a general-purpose IO core and a graphics bus (G bus) optimized for transfer of image data. High-speed data transfer with a high degree of parallel operation essential for simultaneous operation in a multifunction switch is realized by connecting a memory, a processor and the buses thereof via a crossbar switch.

In order to support a synchronous DRAM (SDRAM) having maximum cost performance and minimize a decline in random accessing performance in small data units which cannot enjoy the merits of the burst access high-speed data transfer of a SDRAM in regard to the accessing of a continuous data string, which is typified by image data, an 8-KB 2-way set associative memory front cache is provided within the memory controller. A memory front cache makes it possible to realize higher performance by cache memory without a complicated construction even in a system configuration employing a crossbar switch in which bus snooping for all memory write operations is difficult.

The DoEngine has a data interface (video interface), which is capable of real-time data transfer (device control), for interfacing a printer and scanner. High-quality, high-speed copying can be achieved even in an arrangement in which the scanner and printer are discrete devices by supporting synchronization between devices and executing image processing by hardware.

The DoEngine has a core that operates at 3.3 V and an IO unit that operates at 5 V.

FIGS. 1, 2, and 3A–3C show examples of the configuration of an apparatus or system using the DoEngine. FIG. 1 shows a distributed arrangement in which a local board 101 having a DoEngine is connected to a personal computer (PC) 102 via a PCI interface possessed by the DoEngine. Besides having the DoEngine, the local board 101 is provided with a memory, which is connected to the DoEngine via a memory bus, described later, and color processing circuit (chip). A high-speed scanner 103 and a color/monochromatic printer 104 are connected to the personal computer 102 via the local board 101. By virtue of this arrangement, image information that has entered from the high-speed scanner 103 can be processed by the local board 101 and output from the printer 104 under the control of the personal computer.

Figure 2:
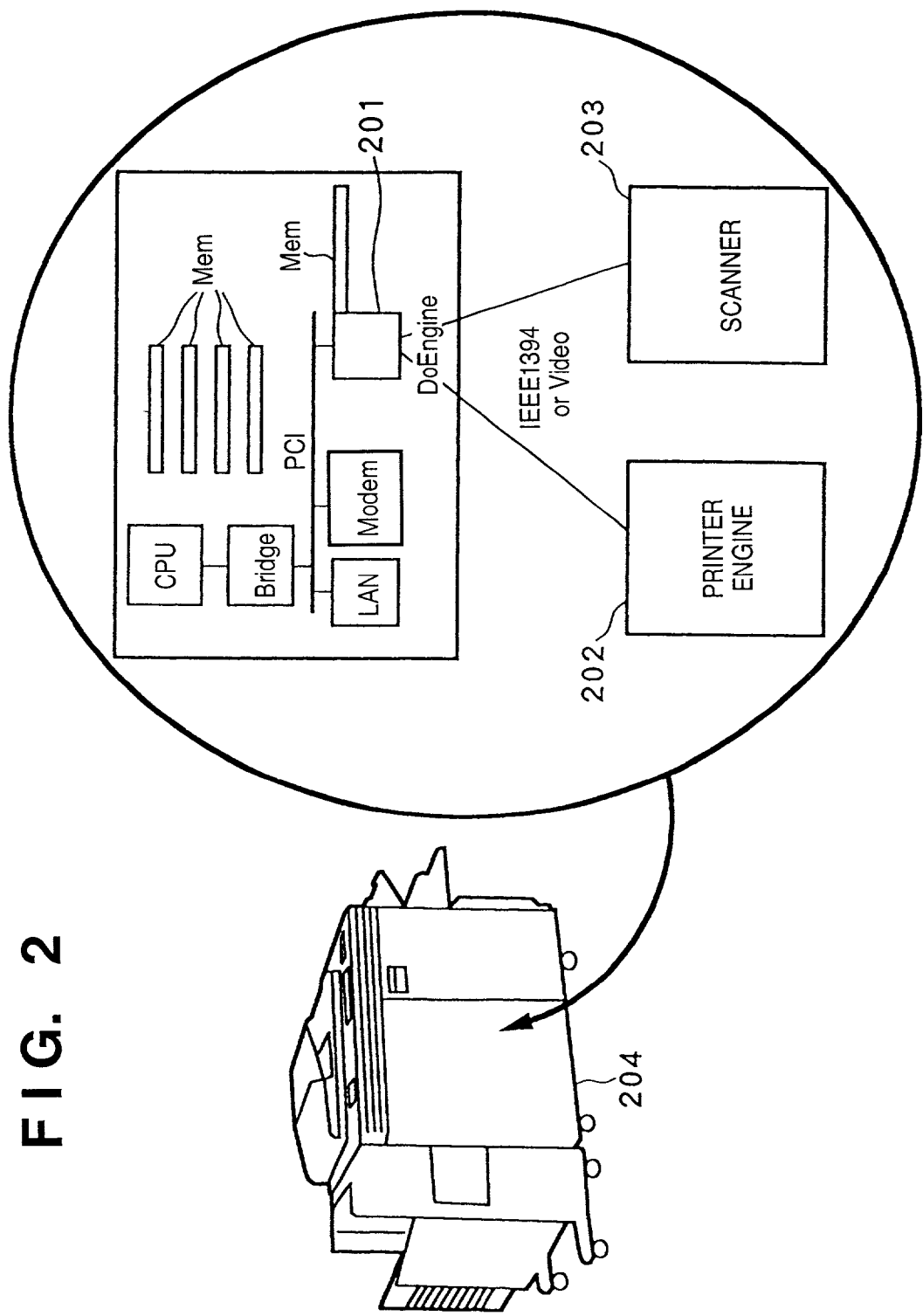
FIG. 2 is a diagram showing the configuration of an apparatus or system using a DoEngine.
Figure 3C:
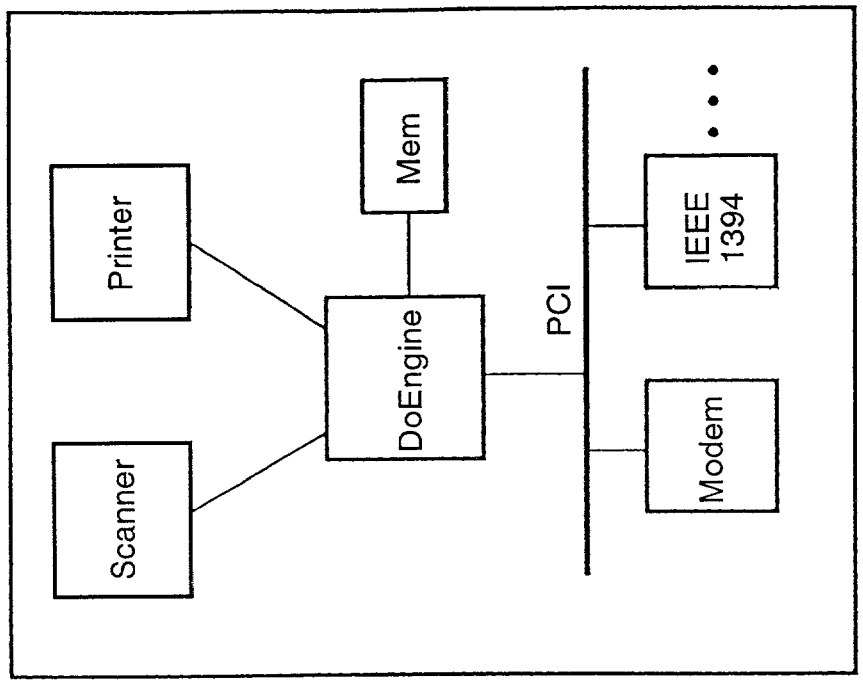
FIGS. 3A–3C are diagrams showing the examples of apparatuses using a DoEngine.
Figure 3A:
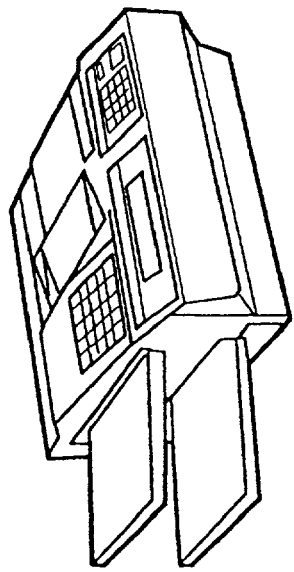
Figure 3B:
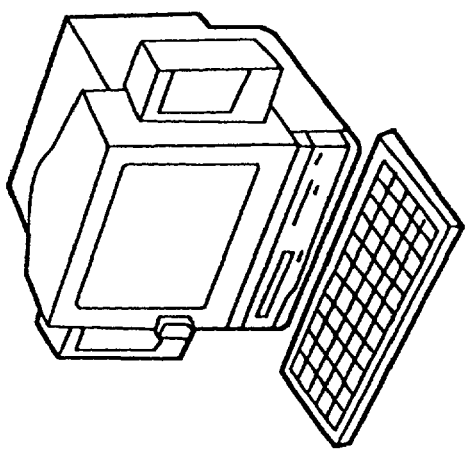

FIGS. 2 and 3A–3C show examples in which a scanner 203 and printer 202 are incorporated in the same device. FIG. 2 shows a configuration 204 resembling an ordinary copier which a printer engine 202 and a scanner 203 are controlled by Doengine 201, FIG. 3A illustrates the arrangement of a facsimile apparatus or the like, and FIG. 3B shows a computer for controlling the arrangement of FIG. 3A. FIG. 3C shows functional diagram of the arrangement illustrated by FIGS. 3A and 3B.

FIGS. 1 and 2 show examples of use in a slave mode, in which the DoEngine is controlled by an external CPU connected via the PCI interface. FIGS. 3A–3C show examples of use in a master mode, in which the CPU of the DoEngine is the nucleus and controls the device connected via the PCI interface.

Table 1 illustrates the specifications of the DoEngine. The DoEngine is equipped with a PCI, memory bus, video, general-purpose input/output, IEEE 1284, RS232C, 100baseT/10baseT, LCD panel and keys as external interfaces. As for the internal blocks, the DoEngine is equipped with a primary cache, a memory controller with cache, a copy engine, an IO bus arbiter and a graphic bus arbiter, etc., in addition to the CPU core. A DMA controller has five channels and arbitration is carried out in accordance with a priority first-come first-served scheme along with the graphics bus and IO bus.

TABLE 1

| ITEM | SUMMARY | SPECIFICATIONS |
| --- | --- | --- |
| CHIP | OPERATION FREQUENCY | INTERNAL: 100 MHz; |
|  |  | EXTERNAL BUS & MEMORY BUS: |
|  | PACKAGE | 100 MHz |
|  | EXTERNAL INTERFACE | 313-PIN BGA |
|  |  | PCI |
|  |  | MEMORY BUS |
|  |  | VIDEO |
|  |  | GENERAL-PURPOSE I/O |
|  |  | 1EEE1284 |
|  |  | RS232C |
|  |  | (USB) |
|  |  | LAN 100/10baseT |
|  |  | LCP PANEL & KEYS |

TABLE 1-continued

| ITEM | SUMMARY | SPECIFICATIONS |
|---|---|---|
| | INTERNAL BLOCKS | CPU CORE |
| | | PRIMARY CACHE |
| | | MMU |
| | | ICU |
| | | SYSTEM BUS BRIDGE |
| | | CONTROLLER W. CACHE |
| | | COPY ENGINE |
| | | PLL |
| | | POWER CONTROL UNIT |
| | | IO BUS ARBITER |
| | | GRAPHICS BUS ARBITER |
| DMA CONTROLLER | NUMBER OF CHANNELS | FIVE CHANNELS |
| | MAX. TRANSFER SPEED (PEAK) | 200 MB/s @ 50 MHz |
| | TRANSFER-CAPABLE PATH | INTERNAL OUTPUT BLOCK <-> LOCAL MEMORY |
| MEMORY & BUS CONTROL | SUPPORT MEMORY | SDRAM |
| | DATA WIDTH | 64 BITS |
| | MAXIMUM MEMORY CAPACITY | 1 GB |
| | MAXIMUM MEMORY BUS TRANSFER SPEED | 682 MB/s |
| GRAPHICS BUS | ARBITRATION METHOD | PRIORITY FIRST-COME FIRST-SERVED PROCESSING |
| | MAXIMUM BUS TRANSFER SPEED | 800 MB/s |
| | BUS WIDTH | 64 BITS, 100 MHz |
| PCI BUS | PCI BUS FORMAT | Rev 2.1, 32-BIT, 33M PCI |
| | TRANSFER SPEED WHEN MASTER | READ 96 MB/s. WRITE 88 MB/s |
| | TRANSFER SPEED WHEN SLAVE | READ 101 BM/s, WRITE 111 MB/s |
| IO BUS | ARBITRATION METHOD | PRIORITY FIRST-COME FIRST-SERVED PROCESSING |
| | MAXIMUM BUS TRANSFER SPEED | 200 MB/s |
| | BUS WIDTH | 32 BITS, 50 MHz |

In the following, the chip construction of DoEngine will be described.

Figure 4:
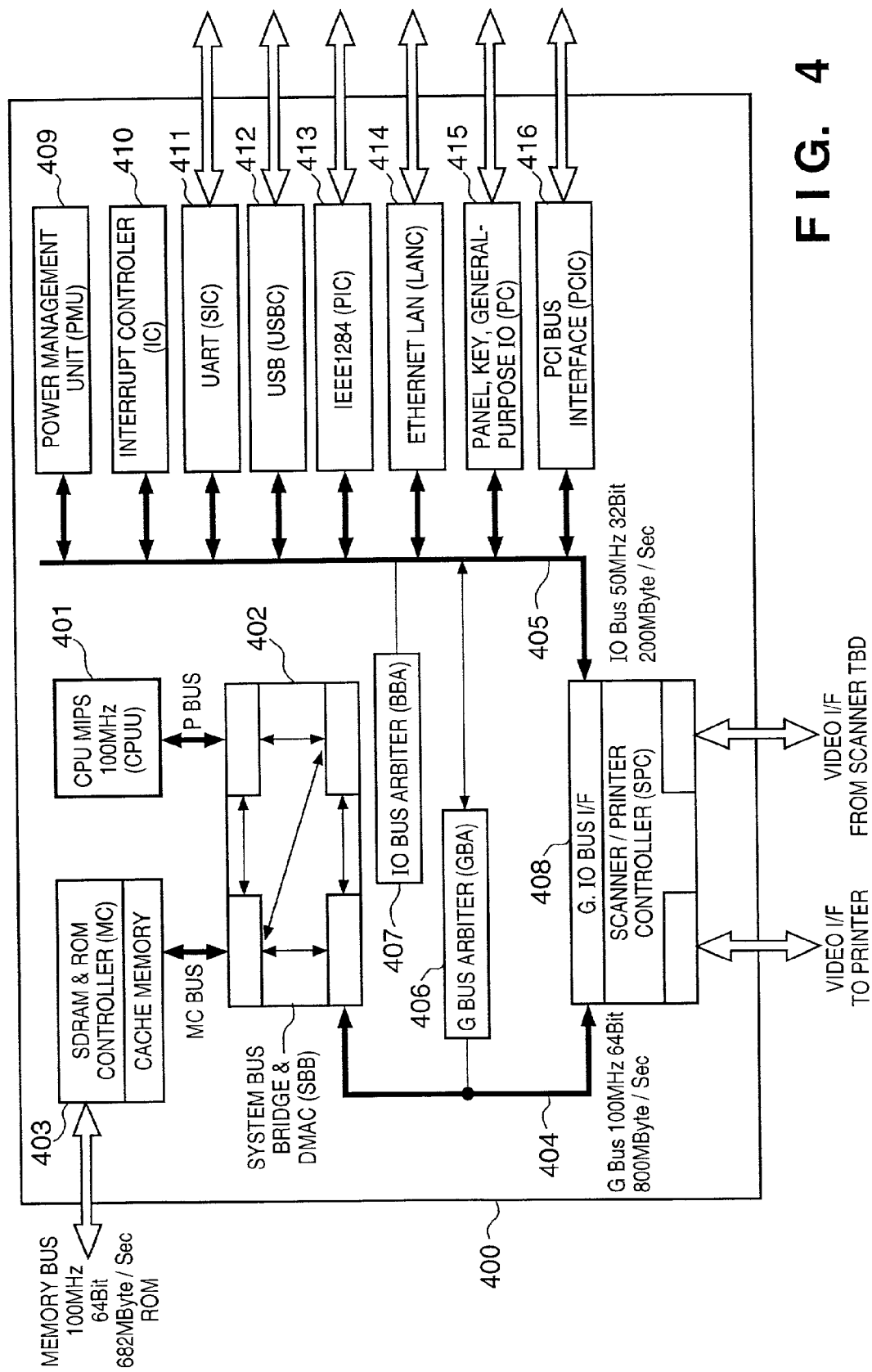
FIG. 4 is a block diagram of a DoEngine.

FIG. 4 is a block diagram of the DoEngine. The DoEngine, indicated at 400, was designed and developed as a controller mainly of next-generation multifunction peripherals (MFPs) or multifunction systems (MFSs). A MIPS R4000 core manufactured by MIPS Technologies, Inc. is employed as a CPU (processor core) 401. Packaged in the processor core 401 are cache memories of 8 KB each for instructions and data, an MMU, etc. The processor core 401 is connected to a system bus bridge (SBB) 402 via a 64-bit processor bus (P bus). The SBB 402 is a 4×4 64-bit cross-bus switch and is also connected to a memory controller 403, which is for controlling an SDREAM and ROM and has a cache memory, via a special-purpose local bus (MC bus), and to a G bus 404, which is a graphics bus, and an IO bus 405, which is an input/output bus. Thus, the system bus bridge 402 is connected to a total of four buses. The system bus bridge 402 is connected to these buses on a one-to-one basis. To the greatest extent possible the system bus bridge 402 is designed in such a manner that the two pairs of buses can be connected in parallel.

The G bus 404 is controlled by a G bus arbiter (GBA) 406 and is connected to a scanner/printer controller (SPC) 408 for connecting a scanner and printer. The IO bus 405 is controlled by an IO bus arbiter (BBA) 407 and is connected to an SPC 408, a power management unit (PMU) 409, an interrupt controller (IC) 410, a serial interface controller (SIC) 411 which uses a UART, a USB controller 412, a parallel interface controller (PIC) 413 which uses an IEEE 1284, a LAN controller (LANC) 414 which uses an Ethernet, an LCD panel, key, general-purpose input/output controller (PC) 415, and a PCI bus interface controller (PCIC) 416.

The overview of the Doengine is mentioned above.

The first embodiment is characterized in that image processing including scan processing and add-on processing is realized by using a DoEngine.

Figure 5:
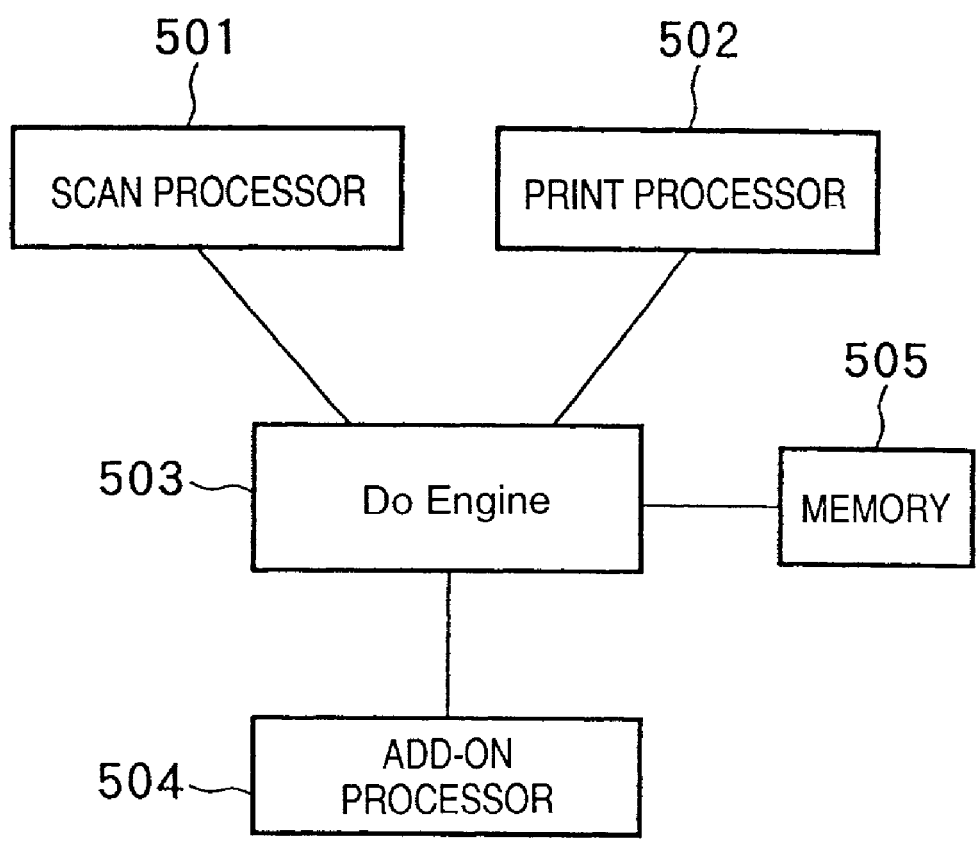
FIG. 5 is a block diagram showing a configuration for realizing scan processing and add-on processing.

Scan processing and add-on processing in the first embodiment will be explained. FIG. 5 shows a functional block configuration for realizing scan processing and add-on processing in the image processing apparatus of this embodiment. In FIG. 5, image data input by a scan processor 501 is stored in a memory 505 via a DoEngine 503. An add-on processor 504 performs via the DoEngine 503 add-on processing of adding a machine number by light yellow dots to the image data held in the memory 505. Then, the image data is stored in the memory 505 again. After add-on processing for image data of one page ends, the image data of this page is transferred to a print processor 502 via the DoEngine 503, and printed out.

The first embodiment is characterized in that the scan processor 501 for storing scan data in the memory 505 and the add-on processor 504 for performing add-on processing for data stored in the memory 505 operate simultaneously (in parallel).

Figure 6:
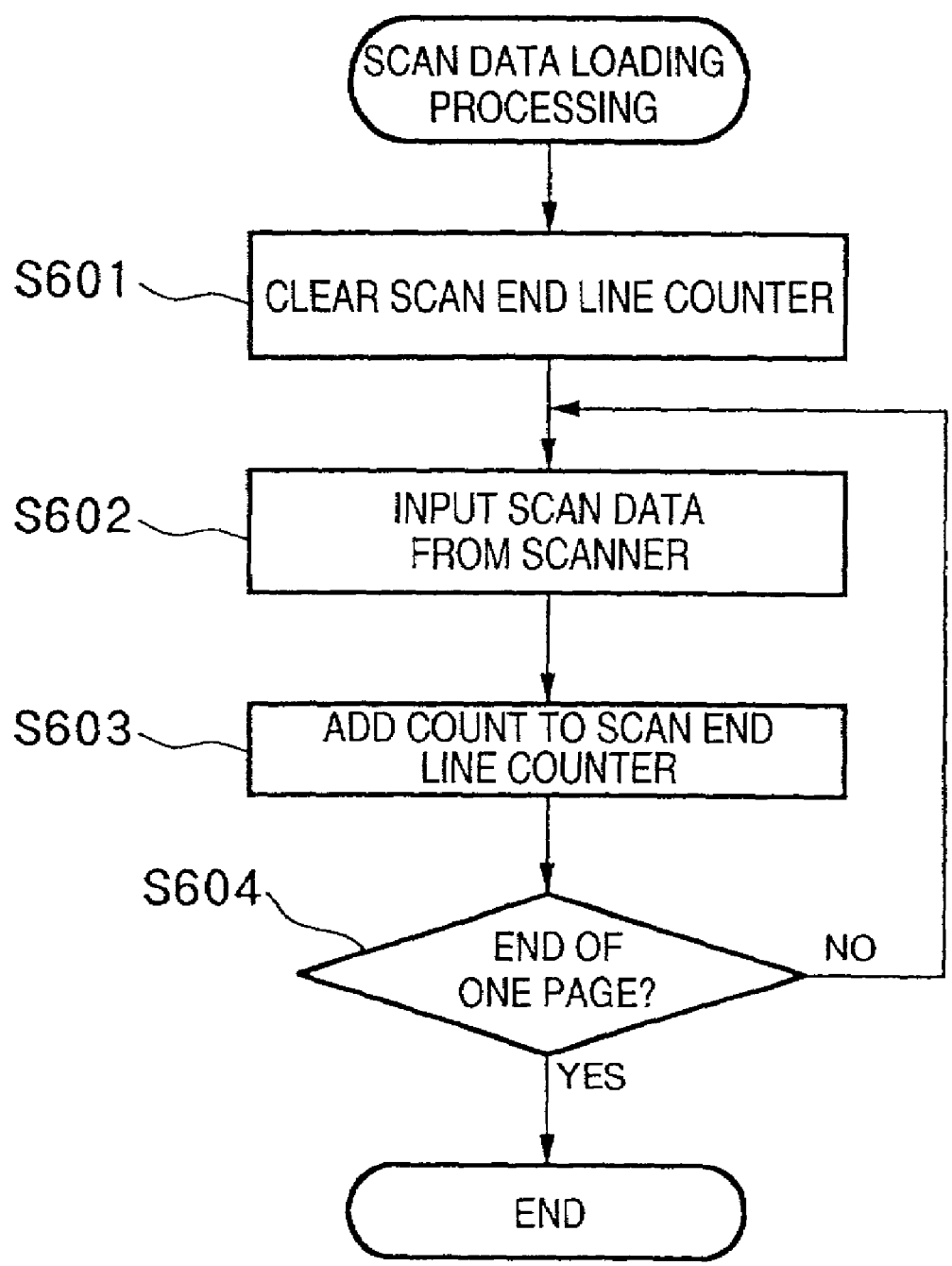
FIG. 6 is a flow chart showing scan data loading processing.
Figure 7:
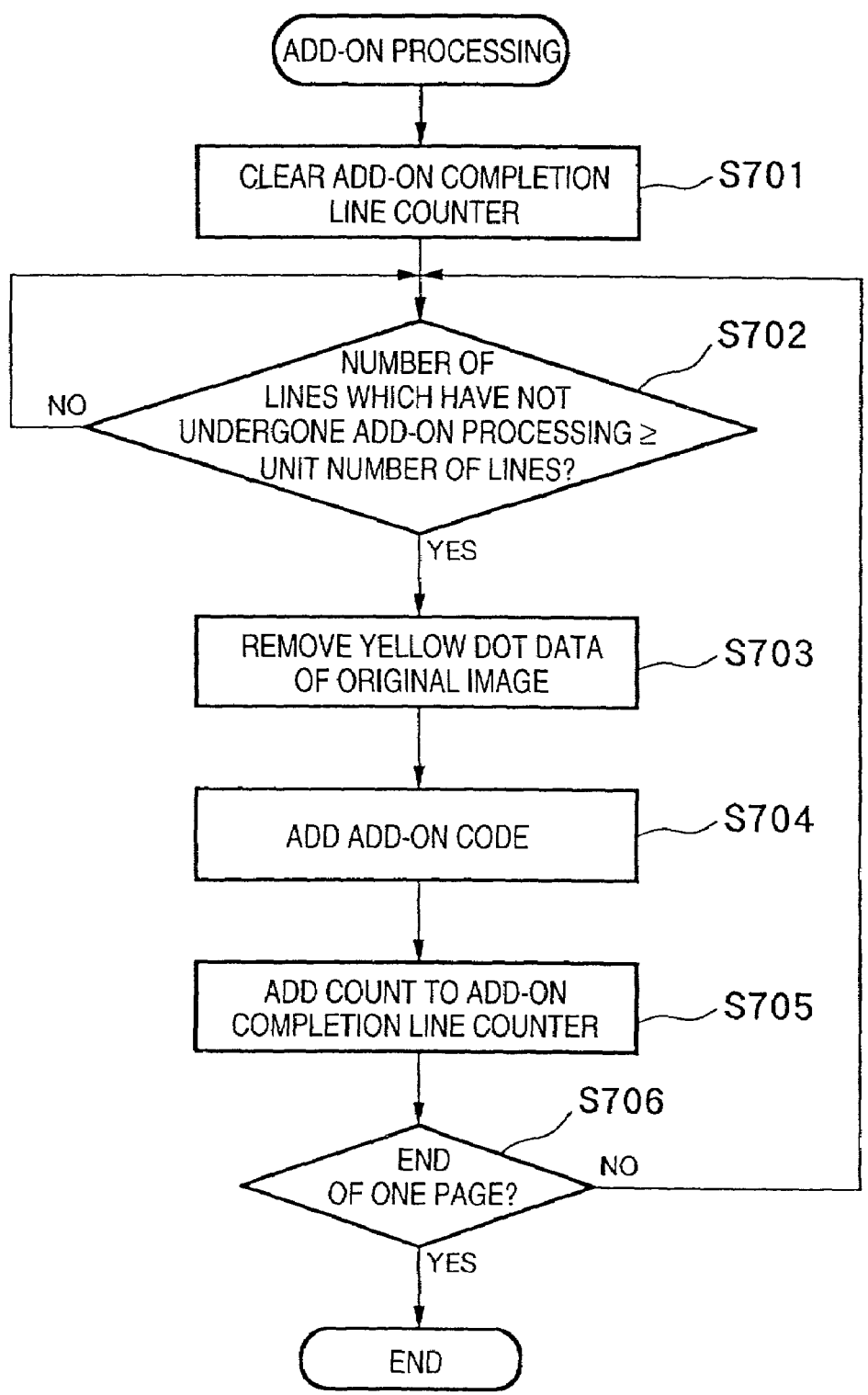
FIG. 7 is a flow chart showing machine number add-on processing.

FIGS. 6 and 7 are flow charts showing operations when the scan processor 501 and the add-on processor 504 are simultaneously executed. This processing is controlled by the DoEngine 503. Note that the scan processor 501 and the add-on processor 504 commonly use the memory 505, but access different addresses. When the two processors simultaneously access the memory 505, the bus arbitration function of the DoEngine 503 stops either of the processors or alternately operates them by time division. This arbitration is done in hardware by the DoEngine 503, and software need not be aware of it.

FIG. 6 is a flow chart showing scan data loading processing in the scan processor 501. The scan processor 501 initializes a scan end line counter to 0 (step S601). The scan processor 501 receives a video signal from a scanner, and stores scan data of one or a plurality of lines in the memory 505 (step S602). The scan processor 501 adds a scanned-line count-to the scan end line counter (step S603). The scan processor 501 repeats steps S602 and S603 until scan of one page ends (step S604).

FIG. 7 is a flow chart showing add-on processing in the add-on processor 504. The add-on processor 504 initializes an add-on completion line counter to 0 (step S701). If the difference between the value of the scan end line counter and that of the add-on completion line counter is smaller than a unit number of lines subjected to add-on processing, i.e., the number of lines which have not undergone add-on processing yet is smaller than the unit number of lines, the add-on processor 504 waits for the progress of scan (step S702). The memory 505 stores at least scan data for the unit number of lines that have not undergone add-on processing yet.

In this case, the unit number of lines is the number of lines in the subscanning direction necessary to store one add-on data. For example, when 4-bit information is to be embedded in one line, and 32-bit data is used for one add-on data, the unit number of lines is 8.

If the number of lines in the memory 505 that have not undergone add-on processing yet is equal to or larger than the unit number of lines, the add-on processor 504 searches scan data for a unit number of lines that are stored in the memory 505 and have not undergone add-on processing yet, and removes yellow dot data which may be mistaken as an add-on code (step S703). The add-on processor 504 adds a predetermined add-on code such as a machine number as yellow dot data to scan data for the unit number of lines (step S704). Then, the add-on processor 504 adds an add-on-processed line count (unit number of lines) to the add-on complete line counter (step S705). The add-on processor 504 repeats steps S702 to S705 until add-on processing of one page ends (step S706).

As described above, according to the embodiment, the image processing apparatus having a plurality of processing functions such as a CPU, memory module, scanner and printer comprises the DoEngine capable of arbitrary connection switching and simultaneous processing of the processing functions. Scan processing and add-on processing can almost simultaneously end using the same memory module. Hence, dedicated memory modules need not be adopted for scan processing and add-on processing. That is, the cost can be decreased, and the throughput of the whole apparatus can be increased.

<Modification>

In the first embodiment, image data of one page is scanned in the memory 505 and subjected to add-on processing. In some cases, however, in an image processing apparatus having hardware (DoEngine) capable of simultaneous processing of a plurality of functions, a scan processor and an add-on processor may not ensure the capacity of one page in a scan processing & add-on processing memory. Even in this case, this modification can use the same memory module when, e.g., a facsimile apparatus executes storage of scan data, add-on processing, FAX data storage and another processing.

In general, when image data received via a modem is stored in an internal memory at the start of scan processing and add-on processing in the facsimile apparatus, the image data stored in the memory is directly saved in a hard disk or erased after printout. That is, the memory is used as a temporary storage, and is not always occupied by one processing.

In this modification, therefore, the current free space of the memory is confirmed prior to the start of processing of one page under the control of the DoEngine, and a memory size used for scan & add-on processing is determined in accordance with the free space.

For example, as a memory used for scan & add-on processing, a memory size corresponding to 128 lines is assigned when image data is being received and a memory size corresponding to 1,024 lines is assigned when no image data is being received. In this manner, a usable memory size is dynamically changed. Note that assigning a memory as large in capacity as possible can increase the processing efficiency.

As described above, even when only a small-capacity memory module can be used, a memory size used for each processing can be dynamically changed in the memory module to execute a plurality of functions in real time. Maximum performance can be obtained using the hardware resources available.

In the above embodiments, scan processing and add-on processing are simultaneously executed using the DoEngine. The present invention can also be applied when add-on processing is done for not only scan data but also image data transmitted from a connected computer or facsimile-received data.

The above embodiments have exemplified add-on processing using yellow. However, the present invention is not limited in the add-on method.

In the above embodiments, data input to the memory and addition of a predetermined code to data in the memory are almost simultaneously executed. However, the present invention is not limited to this example, and includes a case wherein data input and addition are parallel-executed.

<Other Embodiment>

The present invention may be applied to a system constituted by a plurality of devices (e.g., a host computer, interface device, reader and printer) or an apparatus comprising a single device (e.g., a copying machine or facsimile apparatus).

The object of the present invention is realized even by supplying a storage medium (or recording medium) storing software program codes for realizing the functions of the above-described embodiments to a system or apparatus, and causing the computer (or the CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the computer executes the readout program codes, but also when the operating system (OS) running on the computer performs part or all of actual processing on the basis of the instructions of the program codes.

The functions of the above-described embodiments are also realized when the program codes read out from the storage medium are written in the memory of a function expansion card inserted into the computer or that of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the flow charts shown in FIGS. 6 and 7 described above.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    data input means for inputting image data and storing the image data in a memory;
    addition means for adding a predetermined code to the image data stored in the memory; and
    control means for controlling access to the memory by said data input means and said addition means,
    wherein said control means controls said data input means and said addition means so as substantially simultaneously to operate said data input means and said addition means.

2. The apparatus according to claim 1, wherein said data input means inputs image data scanned by a scanner.

3. The apparatus according to claim 1, further comprising image formation means for forming an image on the basis of the image data which is stored in the memory and to which the predetermined code is added,
    wherein said control means also controls access to the memory by said image formation means.

4. The apparatus according to claim 1, wherein the predetermined code includes a code unique to the apparatus.

5. The apparatus according to claim 4, wherein said addition means adds the predetermined code in yellow.

6. The apparatus according to claim 1, wherein said control means can arbitrarily control connection switching and simultaneous operation of a plurality of components including said data input means, the memory, and said addition means.

7. The apparatus according to claim 2, wherein, when said data input means and said addition means simultaneously access the memory, said control means controls the access by performing bus arbitration.

8. The apparatus according to claim 7, wherein, when said data input means and said addition means simultaneously access the memory, said control means stops either of said data input means and said addition means by the bus arbitration, or alternately operates said data input means and said addition means by time division.

9. The apparatus according to claim 8, wherein said control means operates said data input means while a difference between the number of lines of image data input by said data input means and the number of lines processed by said addition means does not reach a predetermined number.

10. The apparatus according to claim 9, wherein the predetermined number is the number of lines necessary for addition of the predetermined code by said addition means.

11. The apparatus according to claim 2, wherein said control means dynamically changes a usable size in the memory in accordance with operation statuses of the plurality of components.

12. An image processing system comprising:
    an image input device for inputting image data;
    a memory device for holding the image data;
    an image processing apparatus for adding a predetermined code to the image data held in said memory device; and
    a control device for controlling access to said memory device by said image input device and said image processing apparatus,
    wherein said control device controls said image input device and said image processing apparatus so as substantially simultaneously to operate said image input device and said image processing apparatus.

13. The system according to claim 12, further comprising an image formation device for forming an image on the basis of the image data which is held in said memory device and to which the predetermined code is added,
    wherein said control device also controls access to said memory device by said image formation device.

14. A control method for an image processing apparatus having data input means for inputting image data, addition means for adding a predetermined code to the image data, a memory for holding the image data, and control means for controlling access to the memory by a plurality of components including the data input means and the addition means, comprising:
    the data input step of storing the image data input by the data input means in the memory; and
    the addition step of causing the addition means to add the predetermined code to the image data stored in the memory,
    wherein the data input step and the addition step are substantially simultaneously executed by the control means.

15. A control program stored on a computer readable medium in an image processing apparatus having data input means for inputting image data, addition means for adding a predetermined code to the image data, a memory for holding the image data, and control means for controlling access to the memory by a plurality of components including the data input means and the addition means, comprising:
    a code of the data input step of storing the image data input by the data input means in the memory; and
    a code of the addition step of causing the addition means to add the predetermined code to the image data stored in the memory,
    wherein the data input step and the addition step are substantially simultaneously executed by the control means.

16. A storage medium which stores the program defined in claim 15.

17. An image processing apparatus comprising:
    data input means for inputting image data and storing the image data in a memory;
    addition means for adding a predetermined code to the image data stored in said memory; and
    control means for controlling access to the memory by said data input means and said addition means,
    wherein said control means controls said data input means and said addition means so as to operate said data input means and said addition means in parallel.

18. The apparatus according to claim 17, wherein said data input means inputs image data scanned by a scanner.

19. The apparatus according to claim 17, further comprising image formation means for forming an image on the basis of the image data which is stored in the memory and to which the predetermined code is added, wherein
    said control means also controls access to the memory by said image formation means.

20. The apparatus according to claim 17, wherein the predetermined code includes a code unique to the apparatus.

21. The apparatus according to claim 20, wherein said addition means adds the predetermined code in yellow.

22. The apparatus according to claim 17, wherein said control means can arbitrarily control connection switching and simultaneous operation of a plurality of components including said data input means, the memory, and said addition means.

23. The apparatus according to claim 22, wherein, when said data input means and said addition means simultaneously access the memory, said control means controls the access by performing bus arbitration.

24. The apparatus according to claim 23, wherein, when said data input means and said addition means simultaneously access the memory, said control means stops either of said data input means and said addition means by the bus arbitration, or alternately operates said data input means and said addition means by time division.

25. The apparatus according to claim 24, wherein said control means operates-said data input means while a difference between the number of lines of image data input by said data input means and the number of lines processed by said addition means does not reach a predetermined number.

26. The apparatus according to claim 25, wherein the predetermined number is the number of lines necessary for addition of the predetermined code by said addition means.

27. The apparatus according to claim 22, wherein said control means dynamically changes a usable size in the memory in accordance with operation statuses of the plurality of components.

28. An image processing system comprising:
an image input device for inputting image data;
a memory device for holding the image data;
an image processing apparatus for adding a predetermined code to the image data held in said memory device; and
a control device for controlling access to said memory device by said image input device and said image processing apparatus,
wherein said control device controls said image input device and said image processing apparatus so as to operate said image input device and said image processing apparatus in parallel.

29. The system according to claim 28, further comprising an image formation device for forming an image on the basis of the image data which is held in said memory device and to which the predetermined code is added, wherein
said control device also controls access to said memory device by said image formation device.

30. A control method for an image processing apparatus having data input means for inputting image data, addition means for adding a predetermined code to the image data, a memory for holding the image data, and control means for controlling access to the memory by a plurality of components including the data input means and the addition means, comprising:
the data input step of storing the image data input by the data input means in the memory; and
the addition step of causing the addition means to add the predetermined code to the image data stored in the memory,
wherein the data input step and the addition step are executed by the control means in parallel.

31. A control program stored on a computer readable medium in an image processing apparatus having data input means for inputting image data, addition means for adding a predetermined code to the image data, a memory for holding the image data, and control means for controlling access to the memory by a plurality of components including the data input means and the addition means, comprising:
a code of the data input step of storing the image data input by the data input means in the memory; and
a code of the addition step of causing the addition means to add the predetermined code to the image data stored in the memory,
wherein the data input step and the addition step are executed by the control means in parallel.

32. A storage medium which stores the program defined in claim 31.

* * * * *

UNITED STATES PATENT AND TRADEMARK OFFICE
CERTIFICATE OF CORRECTION

PATENT NO.          : 7,006,258 B2
APPLICATION NO. : 09/745480
DATED                   : February 28, 2006
INVENTOR(S)         : Yukiyoshi Hikichi It is certified that error appears in the above-identified patent and that said Letters Patent is hereby corrected as shown below:

COLUMN 1

Line 55, "comprising;" should read --comprising:--.

COLUMN 2

Line 17, "that" should read --in that--.

COLUMN 4

Line 25, "Doengine 201." should read --DoEngine 201.--.

COULMN 5

Table 1 - Cont'd, "101 BM/s," should read --101MB/s,--.

COULMN 6

Line 39, "Doengine" should read --DoEngine--.

COLUMN 7

Line 12, "count-to" should read --count to--.

COLUMN 9

Line 42, "claim 2," should read --claim 6,--.
    Line 61, "claim 2," should read --claim 6,--.

UNITED STATES PATENT AND TRADEMARK OFFICE
CERTIFICATE OF CORRECTION

PATENT NO. : 7,006,258 B2
APPLICATION NO. : 09/745480
DATED : February 28, 2006
INVENTOR(S) : Yukiyoshi Hikichi It is certified that error appears in the above-identified patent and that said Letters Patent is hereby corrected as shown below:

COLUMN 10

Lines 46-47, Claim 16 should be deleted.

COLUMN 11

Line 19, "operates-said" should read --operates said--.

COLUMN 12

Lines 37-38, Claim 32 should be deleted.

Signed and Sealed this

Seventeenth Day of October, 2006

JON W. DUDAS
*Director of the United States Patent and Trademark Office*